US006579044B1

(12) United States Patent
Trenkwalder et al.

(10) Patent No.: US 6,579,044 B1
(45) Date of Patent: Jun. 17, 2003

(54) METAL-CUTTING TOOL

(75) Inventors: Thomas Trenkwalder, Ehenbichl (AT); Helmut Male, Höfen (AT)

(73) Assignee: Plansee Tizit Aktiengesellschaft, Tirol (AT)

( * ) Notice: Subject to any disclaimer, the term of this patent is extended or adjusted under 35 U.S.C. 154(b) by 218 days.

(21) Appl. No.: 09/708,359

(22) Filed: Nov. 8, 2000

(30) Foreign Application Priority Data

Sep. 19, 2000 (AT) .......................................... 774/99 U

(51) Int. Cl.⁷ ................................................. B26D 1/00
(52) U.S. Cl. ........................................ 407/110; 407/117
(58) Field of Search .............................. 407/110, 114, 407/113, 116, 115, 107, 109, 111, 112

(56) References Cited

U.S. PATENT DOCUMENTS

| 4,645,385 A | * | 2/1987 | Keller | 407/105 |
| 4,887,945 A | * | 12/1989 | Pano | 407/108 |
| 5,035,545 A | * | 7/1991 | Zinner | 407/108 |
| 5,076,738 A | * | 12/1991 | Pano et al. | 407/102 |
| 5,360,298 A | * | 11/1994 | Hedlund | 407/110 |
| 5,375,948 A | * | 12/1994 | Lindstedt | 407/116 |
| 5,411,354 A | * | 5/1995 | Gustafsson | 407/104 |

* cited by examiner

*Primary Examiner*—Willmon Fridie, Jr.
(74) *Attorney, Agent, or Firm*—Morgan & Finnegan, LLP

(57) ABSTRACT

The invention pertains to a metal-cutting tool with at least one recess (2) for receiving a cutting insert (3). The cutting insert (3) is securely clamped in the recess (2) by an elastic clamping arm (8), which forms the upper contact surface (14) of the recess (2). According to the invention, the lower contact surface (4) of the cutting insert (3) and the lower contact surface (9) of the recess (2) are at least partially configured in an arc. The radius (r) of the arc of the contact surface (9) is designed slightly smaller than the arc (R) of the contact surface (4). The upper contact surface (5) of the cutting insert (3) and the contact surface (14) of the clamping arm (8) are matched in such a way that mutual contact takes place in a range which is at a distance from the symmetry line (S) in the direction of the cutting edge (11) of the cutting insert (3).

7 Claims, 2 Drawing Sheets

METAL-CUTTING TOOL

BACKGROUND OF THE INVENTION

The invention pertains to a metal-cutting tool comprising a disk-shaped or blade-shaped basic body with at least one recess for receiving a cutting insert with lower, upper and rear contact surface, which [insert] is interchangeably clamped securely in the recess by an elastically spreadable clamping arm forming the upper contact surface of the recess, while the mutual contact surfaces of the cutting insert and the recess are designed to fit together positively.

The so-called "self clamping principle," according to which the cutting insert is securely clamped in a recess in the basic body of the tool by a part of said basic body designed as an elastic clamping arm, is primarily applicable in the case of long, narrow cutting inserts, such as are used in tools for grooving or plugging, or also in side-milling cutters.

The clamping power that securely clamps the cutting insert in the receiver represents the elastic force of the clamping arm, which is either automatically spread apart to make clamping contact when the cutting insert is pushed into the receiver or spread beyond the clamping position with a suitable tool prior to the seating of the cutting insert, whereby the positioning of the cutting insert in the receiver is facilitated.

The maximal clamping force that can be applied is limited for constructive or technical material reasons, so that it is possible for the cutting insert to be dislodged from the receiver, especially in the case of side-milling cutters involving high centrifugal forces when in use, and also in the case of grooving tools when the tool is withdrawn from the groove or in boring operation.

It is therefore important in the case of these tools that adequate measures be taken to preclude the inadvertent dislodgment of the cutting inserts from the receiver.

DE OS 30 44 790 describes a side-milling cutter in which the cutting inserts are wedge-shaped and their clamping in the basic body of the tool is achieved by wedging in the similarly wedge-shaped receiver slit with one of its arms designed to be partly elastic.

Disadvantageous here is the fact that the cutting insert has no defined depth stop, so that the wedging can be either too tight, resulting in difficulty in loosening the cutting insert during change-over, or too loose, resulting in inadvertent loosening of the cutting insert due to centrifugal force when the tool is used.

Furthermore, exact mutual positioning of the individual cutting edges is only possible with difficulty.

EP 0 660 785 describes a metal-cutting tool of the general type cited in the preamble, especially a grooving tool, in which the cutting insert has several variably inclined partial surfaces on its contact surface facing the clamping arm, while the clamping arm engages two differently inclined partial surfaces in a defined manner, so that the cutting insert should not be readily dislodged from the clamped position even when subjected to tensile stresses.

Disadvantageous in the case of such a design is that the clamping force is applied primarily in the direction of the lower contact surface of the cutting insert and the component of the clamping force that presses the cutting insert against the rearward stop and therefore protects against a dislodgment of the cutting insert from the receiver very small, so that in many applications the cutting insert can still be pulled out of the receiver.

OBJECT OF THE INVENTION

It is therefore the objective of the present invention to create a metal-cutting tool of the general type cited in the preamble, in which the cutting insert can be easily seated in the receiver recess, while at the same time a securely clamped position is ensured even against This is accomplished according to the invention, in that the lower contact surface of the cutting insert is delimited by a convex arc with the radius (R) and that the lower contact surface of the recess is delimited by a concave arc with the radius (r), wherein R>r, whereby two defined contact points (A) are formed at approximately the beginning and the end of the contact surfaces, further that the upper contact surface of the cutting insert and the contact surface of the clamping arm are matched together in such a way that the charging of the contact surface with the clamping force occurs in an area which is at a distance from the symmetry line (S) in the direction of the cutting edge of the cutting insert, so that the symmetry line (S) is the normal on the connecting line (V) of the two contact points (A), which symmetry line, halves the separation of the two contact points (A).

By reason of the arc configuration of the lower contact surfaces according to the invention and the opposing eccentrically applied clamping force, the clamping force is applied at about 60% to the lower contact surfaces and about 40% to the rearward contact surfaces. The arc configuration of the lower contact surfaces can extend over the entire contact surface or over only the sections at the beginning and the end of the contact surface in the immediate vicinity of the complementary contact points (A). The difference of the radii of the two contact surfaces can be very slight and can be only a few tenths of a mm in actual practice.

Especially in conjunction with an inclination of the rearward contact surfaces in the direction of the active cutting edge of the cutting insert, so that they describe an acute angle (α) with the connecting line (V) of the contact points (A), a good wedging of the cutting insert in the receiver is achieved and dislodgment of the cutting insert from the receiver by tensile or centrifugal forces is precluded.

According to the invention, for a better application of the clamping force in the correct area on the cutting insert, the recess for the cutting insert must be so configured that it has its narrowest slit width in the area according to the invention.

Due to the fact that the radius (r) of the arc of the lower contact surface of the recess is smaller than the radius (R) of the arc of the associated contact surface of the cutting insert, a precisely defined two-point contact is theoretically—when viewed from the side—achieved. In actual practice and because of the slightly different radii of the contact surfaces as well as high surface pressures, linear or a real "contact points" are realized, which, due to production tolerances or dimensional variations in the course of frequent change of the cutting insert, can shift slightly from the theoretical contact point.

In one advantageous embodiment of the invention, the lower contact surface of the cutting insert is designed as an arc with the radius (R), while the lower contact surface of the recess is designed with the radius (r) only at the beginning and the end of the arc, while the intervening space is separated by a clearance from the arc.

In this manner, a particularly easy insertion and positioning of the cutting insert in the recess is achieved.

In another advantageous configuration of the invention, the upper contact surface of the cutting insert is designed as a straight line normal to the symmetry line (S) and the application of the clamping force occurs at a contact point (K) on the contact surface of the clamping arm, also designed as a straight line.

In this manner, a particularly good transfer of the clamping force to the rearward contact surfaces is realized.

It has been shown to be especially advantageous for the contact surfaces of the cutting insert and the recess to be of V-shaped configuration in cross section, whereby twisting and tilting of the cutting insert in the recess is reduced.

DESCRIPTION OF THE DRAWING FIGURES

The invention is described in greater detail below with references to the appended figures. These depict:

FIG. 1, in side view, the cutting insert for a metal-cutting tool according to the invention;

DETAILED DESCRIPTION OF THE INVENTION

Figure 1:
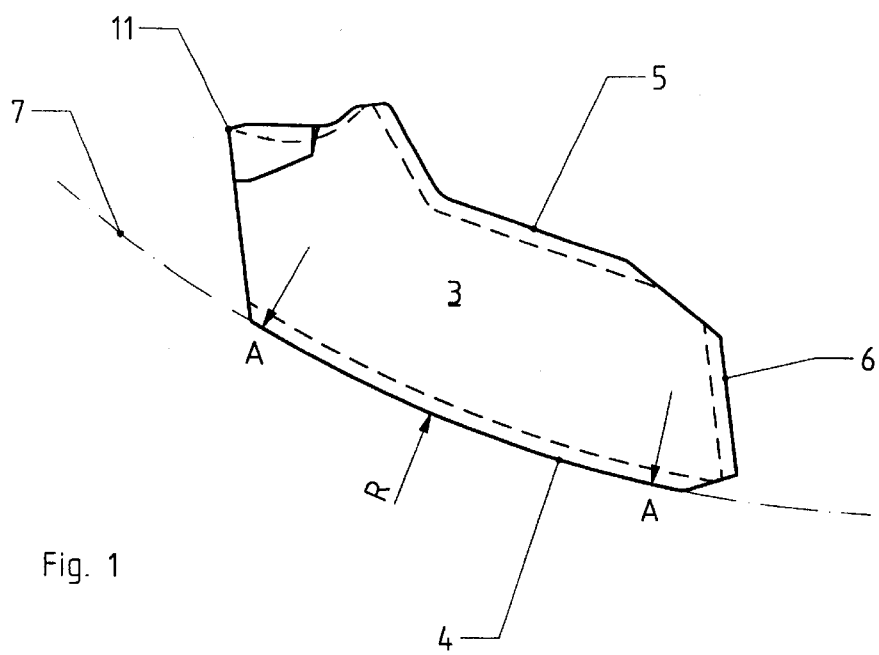
Figure 2:
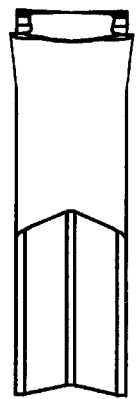
FIG. 2, is the cutting insert from FIG. 1 in frontal view.
Figure 3:
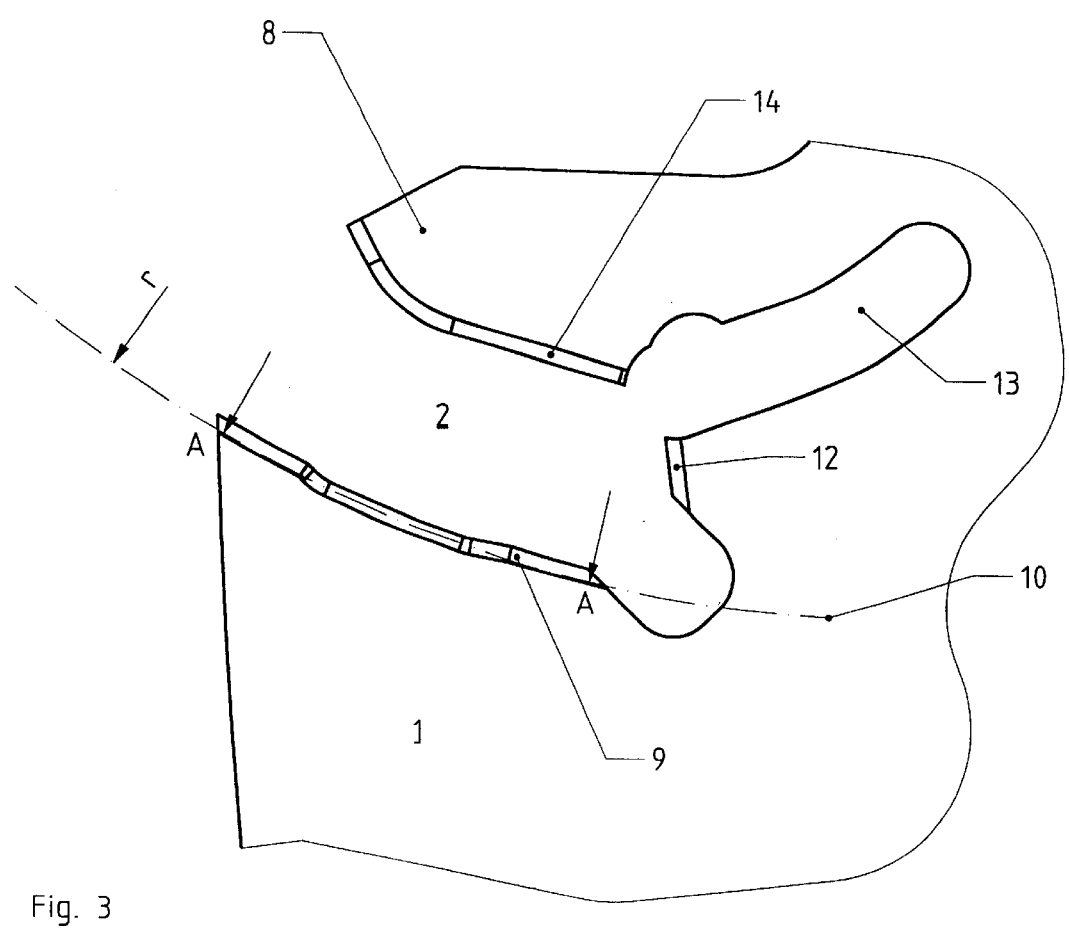
FIG. 3, is in side view, the recess for the cutting insert in FIG. 1.

The cutting insert (3) for a metal-cutting tool, e.g., a side-milling cutter, has an elongated, prismatic form with a cutting edge (11). For positioning the cutting insert (3) in the recess (2) of the basic tool body (1), the cutting insert (3) has a lower contact surface (4), an upper contact surface (5) and a rearward contact surface (6), which are in mutual contact with a lower contact surface (9), an upper contact surface (14) and a rearward contact surface (12) of the recess (2). The contact surfaces (4), (6) and (5) of the cutting insert (3) have a concave V shape when viewed in cross section while the contact surfaces (9), (12) and (14) of the recess (2) are formed in a convex V shape when viewed in cross section. This ensures a good lateral stabilization of the cutting insert (3) in the recess (2).

The upper contact surface (14) of the recess (2) is the section of a unclamping arm (8) that is elastically spreadable, due to a slit-shaped elongation (13) of the recess (2). In the relaxed state of the clamping arm (8) without inserted cutting insert (3), the height of the recess (2) in the area of the clamping point (K) is less than the height of the cutting insert (3) in this area, so that when the cutting insert (3) is inserted, the clamping arm (8) is spread and the cutting insert (3) is securely clamped in the recess by its elastic force.

For seating the cutting insert (3), it is most practical for the clamping arm (8) to be spread with a suitable tool which fits into the slit-shaped elongation (13) and rests against the basic tool body (1). Then the cutting insert (3) can be easily inserted and positioned.

According to the invention, the lower contact surface (4) of the cutting insert lies completely on a convex arc (7) with the radius (R).

The contours of the lower contact surface (9) of the recess (2) lie only at the beginning and the end on a concave arc (10) with a radius (r) that is slightly smaller than the radius (R) of the cutting insert, while the intervening section of the arc (10) is separated, so that a clearance of the cutting insert (3) results.

In this manner—when viewed from the side—a theoretically precisely defined two-point contact of the lower contact surface (4) in the cutting insert (3) is achieved at the beginning and the end of the contact surface (9) in the recess (2).

Figure 4:
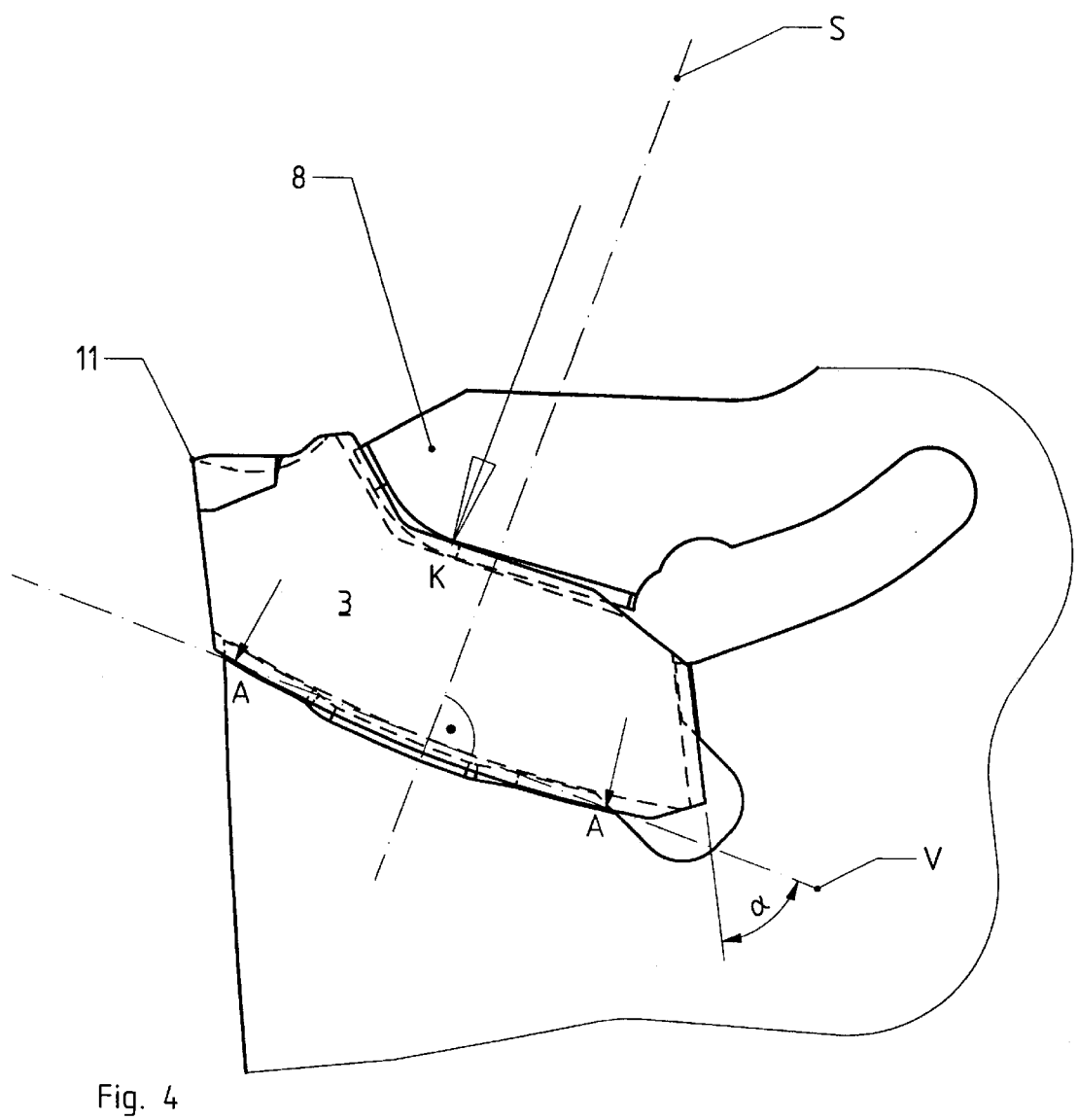
FIG. 4, is in side view, the cutting insert from FIG. 1 in its securely clamped position in the recess.

The upper contact surface (5) of the cutting insert (3) and the upper contact surface (14) of the recess (2)—when viewed from the side—are configured as straight lines, while the two contact surfaces (5) and (14) together describe a slightly acute angle, which is illustrated in FIG. 4. In this manner, a theoretically precisely defined determination of the contact point (K) is realized. The symmetry line (S) is defined as normal on the connecting line (V) of both contact points (A) of the lower contact surfaces (4) and (9), which halves the separation of the two contact points (A).

It is important that the remaining areas of the contact surfaces (5) and (14), which are separated by the symmetry line (S) in the direction away from the cutting edge, have clearance. The rearward contact surfaces (6) and (12)—when viewed from the side—are designed as a straight line inclined toward the cutting edge (11) and describe an acute angle ($\alpha$) with the connecting line (V) of the contact points (A) of the lower contact surfaces (4) and (9).

In this manner, the cutting insert (3) is forced to the rear by the clamping force engaging eccentrically over the curved contact surfaces (4) and (9), and the rearward contact surfaces (6) and (12) are wedged securely together.

What is claimed is:

1. A metal-cutting tool, comprising a disk-shaped or blade-shaped basic body having at least one recess for receiving a cutting insert, said cutting insert and said recess having lower, upper and rearward contact surfaces, said cutting insert adapted to be interchangeably clamped securely in said recess by an elastically spreadable clamping arm, which forms the upper contact surface of said recess while the mutual contact surfaces of the cutting insert and the recess are designed to fit together positively, wherein said lower contact surface of said cutting insert has a convex arc with the radius (R) and said lower contact surface of said recess has a concave arc with the radius (r), and R>r, whereby two defined contact points are formed at a beginning and an end of said contact surfaces, and wherein said upper contact surface of said cutting insert and said contact surface of said clamping arm are matched in such a way that the application of a clamping force at said contact surface occurs in an area that is at a distance from a symmetry line in a direction toward an active cutting edge of said cutting insert, and wherein said symmetry line is normal to a connecting line of said two defined contact points and is halfway between said two defined contact points.

2. The metal-cutting tool according to claim 1 wherein said rearward contact surfaces of said cutting insert and said recess are inclined toward said active cutting edge, so that they define an acute angle ($\alpha$) with respect to the connecting line between said two defined contact points.

3. A metal-cutting tool according to claim 1 wherein said lower contact surface of the cutting insert is configured as an arc having a radius (R), and said lower contact surface of said recess is configured as an arc having a radius (r) at approximately the beginning and the end of said arc, while the intervening space is separated by a clearance from said arc.

4. A metal-cutting tool according to claim 1 wherein said upper contact surface of said cutting insert forms a straight line normal to said symmetry line and wherein the application of the clamping force occurs at a contact point on said contact surface of said clamping arm, which is also configured in a straight line.

5. A metal-cutting tool according to claim 1 wherein said contact surfaces of said cutting insert and said contact surfaces of said recess are V-shaped in cross section.

6. A metal-cutting tool according to claim 1 wherein said metal cutting tool is a side-milling cutter.

7. A cutting insert for use in a metal-cutting tool according to claim 1 having a lower contact surface configured as a convex arc with the radius (R) and an upper contact surface configured to match with the contact surface of said clamping arm in such a way that the application of a clamping force at said upper contact surface occurs in an area that is at a distance from a symmetry line in a direction toward an active cutting edge of said cutting insert, and wherein said symmetry line is normal to a connecting line of two defined contact points and is halfway between said two defined contact points, whereby said two defined contact points are formed at a beginning and an end of the lower contact surface.

* * * * *